(12) United States Patent
Field et al.

(10) Patent No.: US 7,765,374 B2
(45) Date of Patent: Jul. 27, 2010

(54) PROTECTING OPERATING-SYSTEM RESOURCES

(75) Inventors: Scott A. Field, Redmond, WA (US); Brandon Baker, Redmond, WA (US); Eric Traut, Bellevue, WA (US); Suyash Sinha, Snohomish, WA (US); Joy Ganguly, Redmond, WA (US); Forrest Foltz, Woodinville, WA (US); David Cutler, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/627,314

(22) Filed: Jan. 25, 2007

(65) Prior Publication Data

US 2008/0183996 A1    Jul. 31, 2008

(51) Int. Cl.
*G06F 21/22* (2006.01)

(52) U.S. Cl. .............. 711/163; 711/6; 711/E12.091

(58) Field of Classification Search ............ 711/163; 726/26; 713/166
See application file for complete search history.

(56) References Cited

U.S. PATENT DOCUMENTS

| | | | |
|---|---|---|---|
| 5,469,556 A | 11/1995 | Clifton | |
| 5,684,948 A * | 11/1997 | Johnson et al. | 726/29 |
| 6,938,164 B1 * | 8/2005 | England et al. | 713/193 |
| 7,694,121 B2 | 4/2010 | Willman et al. | |
| 2003/0101322 A1 * | 5/2003 | Gardner | 711/163 |
| 2003/0120856 A1 * | 6/2003 | Neiger et al. | 711/6 |
| 2004/0044890 A1 * | 3/2004 | Lim et al. | 713/2 |
| 2004/0123288 A1 | 6/2004 | Bennett et al. | |
| 2005/0138370 A1 | 6/2005 | Goud et al. | |
| 2005/0289542 A1 | 12/2005 | Uhlig et al. | |
| 2008/0184373 A1 | 7/2008 | Traut et al. | |

FOREIGN PATENT DOCUMENTS

| | | |
|---|---|---|
| EP | 1271313(A3) | 1/2003 |
| KR | 10-2003-0088492 | 11/2003 |
| WO | WO2006063274(A1) | 6/2006 |
| WO | WO2008091452 A1 | 7/2008 |

* cited by examiner

*Primary Examiner*—Reginald G Bragdon
*Assistant Examiner*—Daniel J Bernard
(74) *Attorney, Agent, or Firm*—Lee & Hayes, PLLC (57) ABSTRACT

This document describes tools capable of enabling a protection agent to determine, from memory inaccessible from an operating-system privilege mode, whether one or more resources of an operating system have been modified. In some instances, these tools may enable the protection agent to reside within a virtual machine monitor. In other instances, the tools may enable the protection agent to reside within a distinct virtual partition provided by the virtual machine monitor. By operating outside of the operating-system privilege mode, the protection agent may be less vulnerable to attacks by entities operating within the operating-system privilege mode.

10 Claims, 8 Drawing Sheets

PROTECTING OPERATING-SYSTEM RESOURCES

BACKGROUND

Processors within computing devices often include privileged and unprivileged modes. Software running in a privileged mode is generally able to execute every instruction supported by the processor. Typically, the operating system kernel runs within the privileged mode, which is sometimes referred to as "Ring 0", "Supervisor Mode", or "Kernel Mode".

In contrast, some software running on the computing device may be constrained to run only in an unprivileged mode. This mode generally allows the software to execute a subset of the processor's instructions. An operating system can thus use the unprivileged mode to limit the activity of software running in this mode. For example, software might be restricted to a particular subset of the computing device's memory. This unprivileged mode is sometimes known as "Ring 3" or "User Mode". In general, computing-device user applications operate in this unprivileged mode.

If a software application operates in this unprivileged mode, the application may request access to a portion of memory that cannot be directly accessed from the unprivileged mode. The application may, for example, wish to perform an operation in this portion of memory such as "create a new file". This request is typically routed through a call gate or other system call instruction, which transitions this unprivileged-mode code into privileged-mode code. This transition ensures that the unprivileged mode does not have direct access to memory that is designated as accessible from privileged mode only.

In accordance with these modes, an author of malicious code may access the privileged mode and install malware that changes the behavior of the computing device. This malware may, for instance, alter the location of files, hide files, modify files, change keystrokes, or the like. Some of this malware may comprise a "rootkit", which not only changes the computing device's behavior but also hides itself within the privileged mode's memory. Antivirus applications running on the computing device may accordingly fail to discover this hidden rootkit, thus allowing the malware to continue its malicious deeds. Furthermore, such malware may patch over an operating system's built-in protection system, as discussed below.

A malware author may access the privileged mode and load malware onto a computing device in a variety of ways, including by tricking the computing-device user into unknowingly installing the malware onto the user's own computing device. As a result, current operating systems often employ one or more protection systems to detect such malware. These protection systems generally monitor certain important operating-system resources to detect any changes to these resources. If such a protection system detects such a change, then the protection system may decide that the particular resource has been infected by malware. These protection systems may also provide, to the user's antivirus application, a list of applications currently resident in the unprivileged mode's memory. Of course, if the malware was successful in hiding, then it will not appear on the provided list. Furthermore, if the malware was successful in patching the protection system, then the protection system may fail to run or otherwise fail to detect any changes to the important operating-system resources.

While these protection systems can be effective, they can also suffer from a few weaknesses. First, these systems often rely on obscurity and are thus vulnerable to exploitation if identified by the malware. That is, if the malware deciphers the identity of and locates the protection system, it may disable the protection system itself. The malware author may also instruct others as to how to do the same. Furthermore and related to the first, these protection systems generally operate in a same protection domain as that of the operating system (e.g., within the privileged mode itself). Therefore, the protection system is itself subject to attack if the malware gains access to the privileged mode and is able to unmask the obscured protection system. Finally, these protection systems initialize at the same time as the operating system or privileged mode. Therefore, if the malware or malware author gains control of the computing device before this initialization, it may prevent the protection system from initializing.

SUMMARY

This document describes tools capable of enabling a protection agent to determine, from memory inaccessible from an operating-system privilege mode, whether one or more resources of an operating system have been modified. In some embodiments, these tools may enable the protection agent to reside within a virtual machine monitor. In other embodiments, the tools may enable the protection agent to reside within a distinct virtual partition provided by the virtual machine monitor. By operating outside of the operating-system privilege mode, the protection agent may be less vulnerable to attacks by entities operating within the operating-system privilege mode.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of operating a protection agent in a manner that makes the protection agent unalterable or inaccessible from an operating-system privilege mode. These tools thus enable protection of the protection agent itself, thereby ensuring the protection agent's ability to detect alterations to important operating-system resources. In addition, these tools may shut down an operating system or an operating-system privilege mode in response to detecting resource alterations or in response to an attempted modification of the protection agent itself. Furthermore, these tools may enable the protection agent to enforce invariance on operating-system resources, without the need to detect resource modification thereafter.

An environment in which the tools may enable these and other actions is set forth below in a section entitled Exemplary Operating Environment. A section entitled Autonomous Protection Agents follows and includes two sub-sections. The first sub-section, entitled Virtual-Machine-Monitor Protection Agents, describes one exemplary way in which a protection agent may reside and execute within a virtual machine monitor. This is followed by another sub-section, entitled Virtual-Partition Protection Agents, describing one exemplary way in which a protection agent may inhabit and execute within a virtual partition separate from an operating system's partition.

Another section entitled Autonomous Protection-Agent Privilege Modes follows and also includes two sub-sections. The first sub-section describes one exemplary way that a virtual-machine-monitor timer may add a protection-agent privilege mode to an underlying processor, and is entitled Protection Requests to a Virtual Machine Monitor. A sub-section entitled Protection-Agent Virtual Processors follows and describes another manner in which a protection-agent privilege mode may be created, in this instance with the use of multiple virtual processors, including one configured to run the protection agent in the protection-agent privilege mode. A section entitled Exemplary Use of the Tools follows and describes an example of the previously-described tools in operation. Finally, a section entitled Other Embodiments of the Tools describes various other embodiments and manners in which the tools may act. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter. For example, while the following sections describe embodiments with a single protection agent, multiple protection agents may also be utilized. In some instances, these protection agents may run independently and side-by-side. In such instances, the protection agents are typically only able to access memory within its respective partition. Furthermore, the techniques described below can be utilized concurrently. That is, different protection agents may utilize different techniques within a same operating environment.

Figure 1:
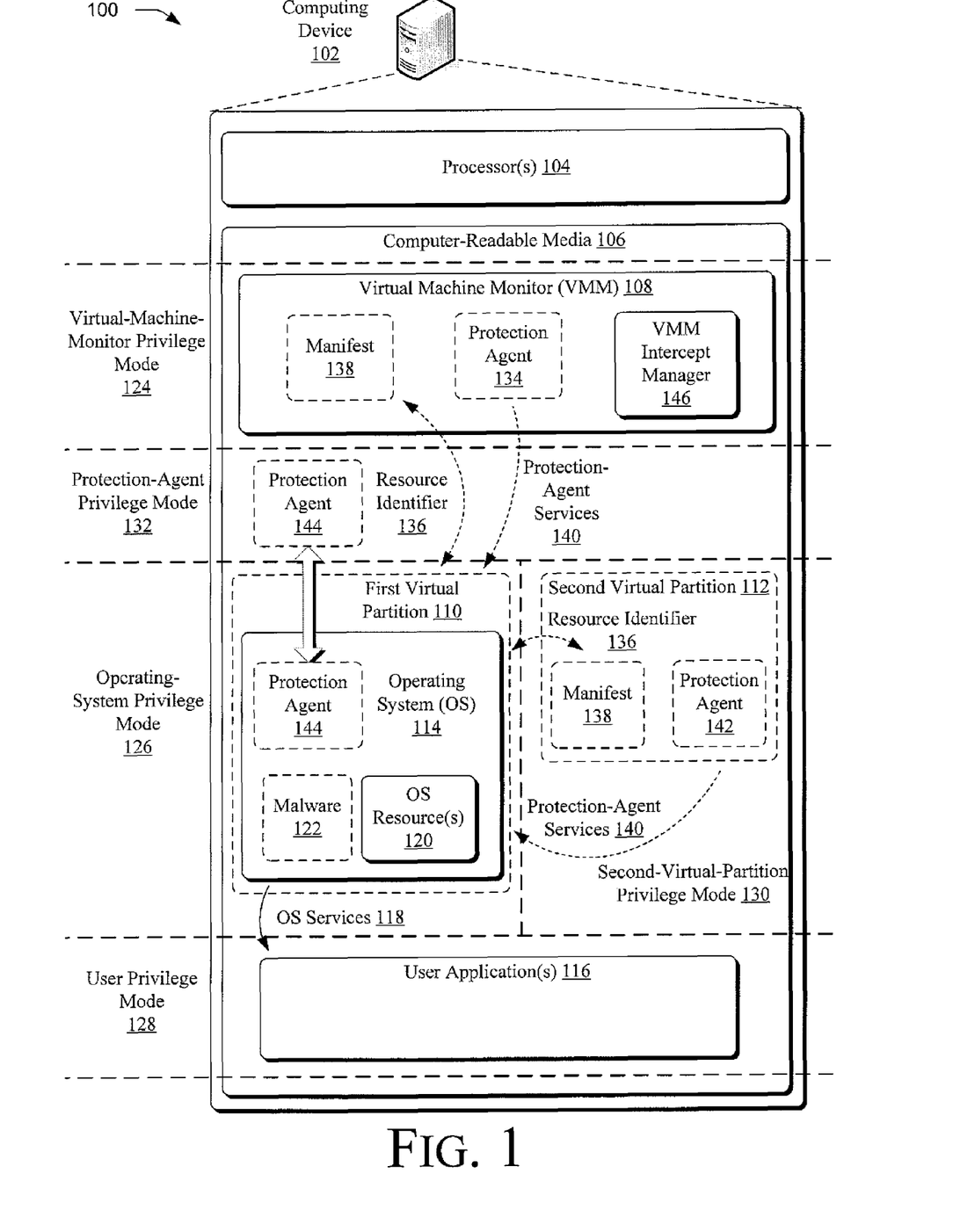
FIG. 1 illustrates an exemplary operating environment in which various embodiments of the tools may operate.

Turning to the current example, FIG. 1 illustrates one such exemplary operating environment generally at 100. This environment includes a computing device 102, which itself includes one or more processors 104 as well as computer-readable media 106. The computer-readable media 106 include a virtual machine monitor 108 (e.g., a hypervisor), which may enable virtualization of the one or more processors into multiple virtual processors. The virtual machine monitor 108 may also enable multiple virtual partitions. One or more virtual processors can be associated with each partition, and these virtual processors are scheduled onto the available physical processors. As illustrated, in some embodiments the virtual machine monitor may enable a first virtual partition 110 and a second virtual partition 112. As discussed in detail below, these partitions may serve to separate operating-system functions from protection-agent services.

Also as illustrated, the computer-readable media 106 further include an operating system (OS) 114 as well as one or more user applications 116. The operating system 114 provides operating-system services 118 to the user applications 116, thus allowing the applications to run on the computing device. In addition, one or more operating-system resources 120 reside on the operating system. Exemplary resources 120 include a system service dispatch table (SSDT), an interrupt dispatch table (IDT), a global descriptor table (GDT), and the like. Also as illustrated, the operating system may include malware 122 (i.e., code with malicious intent), which may have been loaded onto the computing device in the ways discussed above or otherwise. One or more protection agents, discussed below, may detect changes made to the operating-system resources by the malware and, in response to the detection, take defensive action. If the agent makes such a determination, then the protection agent may shut down the operating system and/or the computing device or may take other counteractive action.

Having discussed the computing device's structure, attention now turns to varying privilege modes present on the underlying one or more physical processors 104. Virtual-machine-monitor privilege mode 124 represents the most privileged mode illustrated in FIG. 1. This privilege mode has access to all or substantially all of the device's resources and memory. From the virtual-machine-monitor privilege mode 124, the virtual machine monitor may schedule processors and allow access to areas of memory for each virtual partition.

While an operating system running within a partition may believe that it controls all of the resources of a physical processor, in actuality it only controls a portion as determined by the virtual machine monitor.

Less privileged than the virtual-machine-monitor privilege mode, operating-system privilege mode 126 has access to all of the operating-system resources 120 and most or all operating-system memory. This privilege mode, however, does not have access to any resources or memory associated with another partition, such as the second virtual partition 112. Nevertheless, because this privilege mode generally has access to all of the operating-system memory, it is sometimes referred to as the "Privileged Mode". "Ring 0", "Supervisor Mode", or "Kernel Mode" may also describe this privilege mode. As discussed above, a user application operating within the operating-system privilege mode 126 is generally able to execute most instructions provided by the processor, with the exception of those instructions reserved for virtual-machine-monitor mode.

This operating-system privilege mode is contrasted with user privilege mode 128, sometimes referred to as "Unprivileged Mode", "Ring 3", or simply "User Mode". Also as discussed above, the user application may not access or alter certain memory associated with the operating system when operating from the user privilege mode 128. In general, computing-device user applications operate in this user privilege mode when performing basic operations.

In addition to the modes discussed above, FIG. 1 also illustrates a second-virtual-partition privilege mode 130 and a protection-agent privilege mode 132. As discussed in detail below, the protection-agent privilege mode 132 may have access to a portion of memory that the operating-system privilege mode does not, while generally not having as much memory access as the virtual-machine-monitor privilege mode. As such, this privilege mode may be more privileged than the operating-system privilege mode but less privileged than the virtual-machine-monitor privilege mode.

Also as discussed in detail below, the second-virtual-partition privilege mode generally has access to memory associated with the second virtual partition 112. In addition, this mode may have access to the first virtual partition. Such additional access may, for example, allow a protection agent residing in the second virtual partition to scan memory associated with the first virtual partition and its corresponding operating system. This mode generally does not have access to the virtual machine monitor, and is thus less privileged than the virtual-machine-monitor privilege mode. Nevertheless, the second-virtual-partition privilege mode still has access to a portion of memory that the operating-system privilege mode does not.

Figure 2:
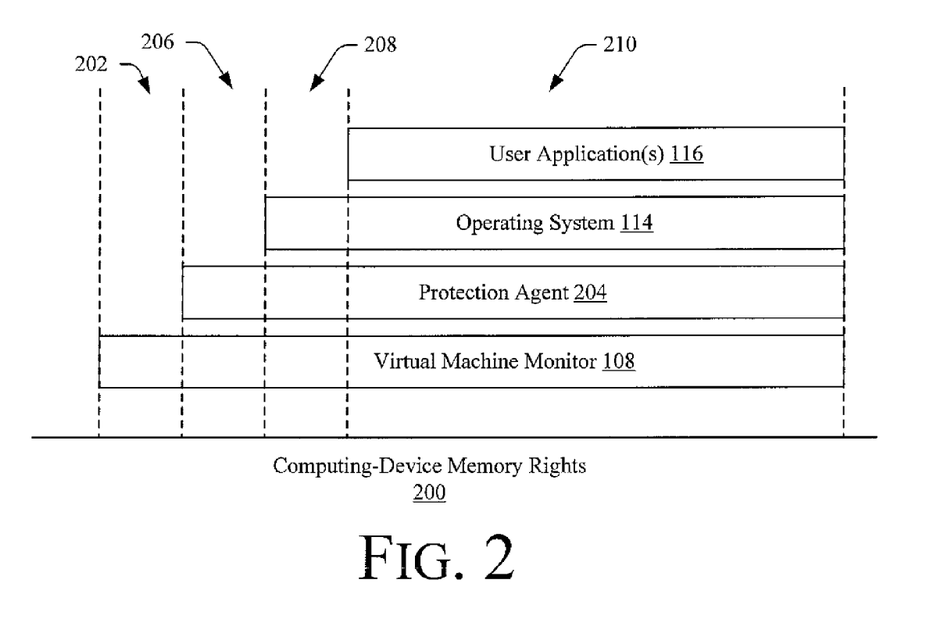
FIG. 2 demonstrates varying computing-device memory rights of the modules illustrated in FIG. 1.

Meanwhile, FIG. 2 illustrates computing-device memory rights 200. This figure thus represents the amount of memory accessible by the modules of FIG. 1. As illustrated, the virtual machine monitor 108—operating in virtual-machine-monitor privilege mode 124—has the most memory rights of all of the modules illustrated. In fact, the virtual machine monitor resides in, and alone has access to, a portion of memory 202. Next, protection agent 204 (e.g., any of the protection agents illustrated in FIG. 1) operates in protection-agent privilege mode 132 and has access to all memory other than the portion 202 corresponding to the virtual machine monitor. The protection agent does, however, have access to a portion of memory 206, which is the portion of memory in which the protection agent itself resides.

The operating system 114, meanwhile, operates in the operating-system privilege mode 126 and has access to all memory other than portion 202 and portion 206. While the operating system may not access to the portion of memory 206 associated with the protection agent, the operating system and its associated privilege mode does have access to a portion of memory 208. This portion of memory 208 is sometimes known as kernel memory or the lowest-level component of an operating system and generally contains the resources shown in FIG. 1. Even if malware loads and operates in the portion of memory 208, however, the malware cannot access the portion of memory 206 associated with the protection agent.

Finally, FIG. 2 illustrates that the user applications 116 only have access to a portion of memory 210. These user applications and corresponding user privilege mode do not have access to the portion of memory 208 associated with the lowest-level component of the operating system. With this operating environment in mind, the following four sections describe in detail exemplary ways that a protection agent may be made unalterable or inaccessible from the operating-system privilege mode.

Autonomous Protection Agents

The following section describes tools capable of determining, from memory inaccessible by an entity operating within an operating-system privilege mode, whether one or more operating-system resources have been modified. As such, the tools may allow for a protection agent to reside in a location other than the location of the operating-system memory itself. More particularly, the following sub-sections describe how protection agents may reside either within a virtual machine monitor or within an autonomous virtual partition.

Virtual-Machine-Monitor Protection Agents

This sub-section describes how a protection agent 134 may reside within the virtual machine monitor itself, as FIG. 1 illustrates. Because the operating-system privilege mode cannot access the virtual machine monitor, this location protects the protection agent from any malware located in the operating-system memory. In order to operate from this location, the protection agent receives an identification of the one or more operating-system resources 120 that the protection agent 134 may monitor. This identification may be received via resource identifier 136. As illustrated, the operating system may provide this information to the virtual machine monitor through application programming interface (API) calls, or the operating system may provide the information in the form of a manifest 138. As discussed above, these resources may include the SSDT, IDT, and GDT.

Once it has received the identification of resources, the protection agent 134 extends protection-agent services 140 to the operating system 114. These protection-agent services generally comprise determining whether any of the identified resources have been altered. If such a determination is made, the protection agent or virtual machine monitor may, for instance, shut down the operating system. The protection-agent services may also include enforcing invariance against any resources marked as unalterable (e.g., "read-only").

Employing such an architecture begins with loading and initializing the virtual machine monitor, which is capable of hosting one or more operating systems. In this example, the virtual machine monitor hosts the single operating system 114, which itself begins initialization after the virtual machine monitor loads. During the operating system's initialization, the portion of memory 208 associated with the lowest-level component of the operating system (e.g., the kernel) first loads. Some or all of the operating-system resources 120 (e.g., the SSDT, GDT, IDT) generally inhabit this portion of memory 208.

Before or while the operating system initializes, the protection agent 134 may begin running from within the virtual machine monitor. As discussed above, the protection agent generally receives an identification of a set of one or more operating-system resources and determines whether one or more of the identified resources have been altered. Note that each identified resource often comprises multiple components at multiple locations, each of which the protection agent may monitor in order to fully protect the entire resource. For example, if the manifest identifies an SSDT as a resource to be monitored and protected, the protection agent not only protects the actual table but also other components of the SSDT. For instance, the protection agent may also monitor and scan the register that points to the table's location. Furthermore, the protection agent may also monitor the memory translation data structures (e.g., page tables) that translate the SSDT's virtual address to a physical address. If the protection agent fails to do so, then malicious code may create another table with different page table mappings (i.e., bypass the SSDT itself).

In addition to identification, the protection agent may also receive a protection attribute instructing the protection agent on how to protect a corresponding resource. For instance, the protection agent may receive an identification of an SSDT resource, as well as a corresponding protection attribute of "read-only". The protection agent therefore learns that the SSDT should remain read-only and, as such, should not be altered. "nit read-only" is another possible protection attribute, which instructs the protection agent that the corresponding resource may write once during initialization, but after such time the resource should remain read-only.

The protection agent may receive this identification of the resources and resource protection attributes in a number of ways, both positively and passively. For example, the operating system may provide a digitally-signed manifest that identifies the resources that the protection agent may monitor. This digitally-signed manifest may identify the resources in a multitude of ways, such as by name (e.g., SSDT, IDT, GDT, etc.) or by address, which maps resources to corresponding locations in the portion of memory 208. In the latter instances, the manifest may identify a resource's guest physical address, guest virtual address, or system physical address. Note that in some instances, a guest physical address may be mapped to an actual system physical address in order to discover the actual physical location of the corresponding resource component.

After the virtual machine monitor or protection agent receives the manifest, these components may determine if the manifest has been tampered with or modified. If the virtual machine monitor or protection agent makes such a determination, the virtual machine monitor or protection agent may opt to fail starting the operating system. In addition, the encryption associated with the list of resources may be invalidated, thus protecting its security.

In addition or in the alternative to the manifest, the protection agent may receive resource and protection attribute identification via one or more application programming interface (API) calls into the virtual machine monitor (e.g., "hypercalls"). As the operating system initializes, the operating system (and perhaps the lowest-level component of the operating system 208) may make hypercalls into the virtual machine monitor informing the protection agent of certain resources that may be monitored and protected. These hypercalls may identify the pertinent resources in the same ways discussed above. Also as discussed above, these hypercalls may also identify resources' protection attributes.

In embodiments utilizing a digitally-signed manifest as well as one or more hypercalls, the protection agent may first scan the resources identified in the manifest before or while the operating system boots. After this initial scan, the operating system may then make hypercalls into the virtual machine monitor instructing the protection agent to determine whether the hypercall-identified pages have been altered. The manifest thus identifies resources to scan upon every operating system boot, while hypercalls identify resources to dynamically scan upon their respective initialization.

Having identified the resources to be monitored, the protection agent then determines whether or not the resources (e.g., all of the portions of the SSDT discussed above) have been altered. The protection agent may also enforce invariance against the identified resources. For example, the protection agent may ensure that any resource designated "read-only" does not change to "writable".

In order to monitor and protect the resources in this way, code executing within the virtual machine monitor may employ a virtual-machine-monitor intercept manager (e.g., manager 146 of FIG. 1). If so instructed, this intercept manager may register for intercepts on the various components of the identified resources. Due to this registration, the protection agent within the virtual machine monitor may now receive intercepts if attempts are made to access or modify these identified resources. As such, the protection agent may inspect and scan the identified resources' various components. It can also actively block attempts to modify these resources.

In some embodiments, the protection agent scans the resources and determines an initial state of the resources for use in comparing the results of future scans. In other embodiments, the protection agent already knows an initial state of the resources for comparing the results of future scans. In any event, the protection agent may compute a hash or checksum value of this initial state. After this computation, the protection agent scans the resources before, after, or while the operating system boots. After the scan, the protection agent computes a hash or checksum of the results and compares this to the initial-state hash or checksum value. If equal, the protection agent determines that the corresponding resources have not been altered. Of course, the protection agent may bypass the hash or checksum values and instead directly compare the initial state to the scan.

If the values are different, however, the protection agent and/or the virtual machine monitor may take one or more responsive actions. First, the protection agent itself may shut down the operating system or operating-system privilege mode, or it may instruct the virtual machine monitor to do so. Again, because the protection agent resides in the virtual machine monitor and because the virtual machine monitor hosts the operating system, these two components are capable of so shutting down the operating system. Furthermore, because the protection agent resides within the virtual machine monitor, the shutting down of the operating system cannot be tampered with from even the operating-system privilege mode.

In addition to shutting down the operating system, the protection agent and/or virtual machine monitor may first warn the operating system of the imminent shutdown. A communication channel between the virtual machine monitor and the operating system may allow such a communication. In the alternative, the protection agent and/or the virtual machine monitor may write a warning to a memory location or signal an event that the operating system monitors.

Without regard to whether or not a warning has been given, the operating system shutdown may be either abrupt or graceful. In the former case, the virtual machine monitor may simply power down the operating system immediately after learning of the disparate hash or checksum values. In the latter case, the virtual machine monitor may allow the operating system a certain amount of time to shut itself down cleanly. In this time, the operating system may, for instance, close any open files and flush any corresponding data. The operating system may also release assigned resources. Furthermore, the shutdown may utilize both approaches. For instance, if the virtual machine monitor hosts multiple partitions, it may immediately shut down the partition with the disparate hash or checksum values while allowing the other partitions time to shut down cleanly. In any event, the manner of shutdown may be configurable by policy and may be adjustable.

In addition to a shutdown and corresponding warning, the protection agent and/or virtual machine monitor may take post-boot actions in response to a non-allowed alteration of an identified resource. For instance, the virtual machine monitor and/or protection agent may, upon reboot of the operating system, notify the operating system of the resource alteration. In response, the operating system may perform an antivirus scan to detect whether any malware does indeed reside within the operating-system memory, such as the portion 208 (e.g., the kernel). Furthermore, the virtual machine monitor may boot the operating system into a safe mode, or the operating system may itself choose to boot into the safe mode. Also in response to the notification, the operating system may identify itself as having been attacked and, as such, may not allow itself to access any network to which it couples.

Virtual-Partition Protection Agents

Instead of residing within the virtual machine monitor itself, a protection agent (e.g., protection agent 142 of FIG. 1) may reside in a separate virtual partition (e.g., second virtual partition 112 of FIG. 1). In these embodiments, this separate partition acts as a trusted delegate of the virtual machine monitor. The protection agent 142 is thus inaccessible from the operating-system privilege mode. As discussed above, the virtual machine monitor 108 provides for such virtualization of the computing device 102. While the virtual machine monitor may virtualize the computing device into any number of partitions, FIG. 1 illustrates a first partition hosting the operating system and a second partition hosting the protection agent. The second virtual partition in which the protection agent resides may be, in some instances, a dedicated security partition whose primary or sole function is to run the protection agent. In other embodiments, this second virtual partition may perform additional functions, such as hosting another operating system.

The protection agent 142 residing within the second virtual partition is capable of performing many or all of the same functions as described above in regards to the protection agent 134 residing within the virtual machine monitor. That is, the protection agent 142 may positively or passively receive an identification of one or more operating-system resources 120. In response to the identification, the protection agent may again extend protection agent services 140, which generally comprise determining whether or not one or more of the identified resources have been altered and, if so, taking responsive action. These services may also include enforcing invariance of specified resources. The protection agent 142 may perform these functions via similar techniques to those described above.

As illustrated, the protection agent 142 is accessible from the second-virtual-partition privilege mode 130, but inaccessible from the operating-system privilege mode 126. As such, the resulting architecture allows for protection of the protection agent itself from any malware located within the operating system, even if the malware resides within the portion of memory 208 associated with the lowest-level component of the operating system.

Autonomous Protection-Agent Privilege Modes

This section describes tools capable of making a portion of operating-system memory associated with a protection agent unalterable or inaccessible from an operating-system privilege mode, while still allowing this portion of memory to physically reside in an operating-system physical memory space. These tools thus create an autonomous protection-agent privilege mode that has access to the portion of memory associated with the protection agent as well as the rest of the memory that is accessible within the operating-system privilege mode. This privilege mode is thus more privileged than the operating-system privilege mode.

The first sub-section describes tools that are capable of creating the protection-agent privilege mode by requesting that a virtual machine monitor protect a portion of memory associated with the protection agent. The second sub-section, meanwhile, describes tools that allow creation of the protection-agent privilege mode by virtualization of a physical processor into multiple virtual processors, including a dedicated virtual processor to run the protection agent.

Protection Requests to a Virtual Machine Monitor

This sub-section describes how a protection agent may request a virtual machine monitor to protect memory associated with the protection agent and, as such, the protection agent itself. This protection results in a protection agent 144 operating in the protection-agent privilege mode 132, as illustrated in FIG. 1. As illustrated, the protection agent 144 may initially reside within the operating-system privilege mode, before shifting to the protection-agent privilege mode. When operating in this latter privilege mode, the protection agent is generally impervious to attacks from entities operating with the operating-system privilege mode 126.

When operating in the protection-agent privilege mode 132, an entity has slightly more privilege than if operating in the operating-system privilege mode 126, but still less privilege than the virtual-machine-monitor privilege mode 124. As FIG. 2 illustrates, a protection agent operating in this privilege mode has access to all of the memory associated with the operating system, in addition to the portion of memory 206 associated with the protection agent itself. The virtual machine monitor 108 enforces the added protection-agent accessibility.

Figure 3:
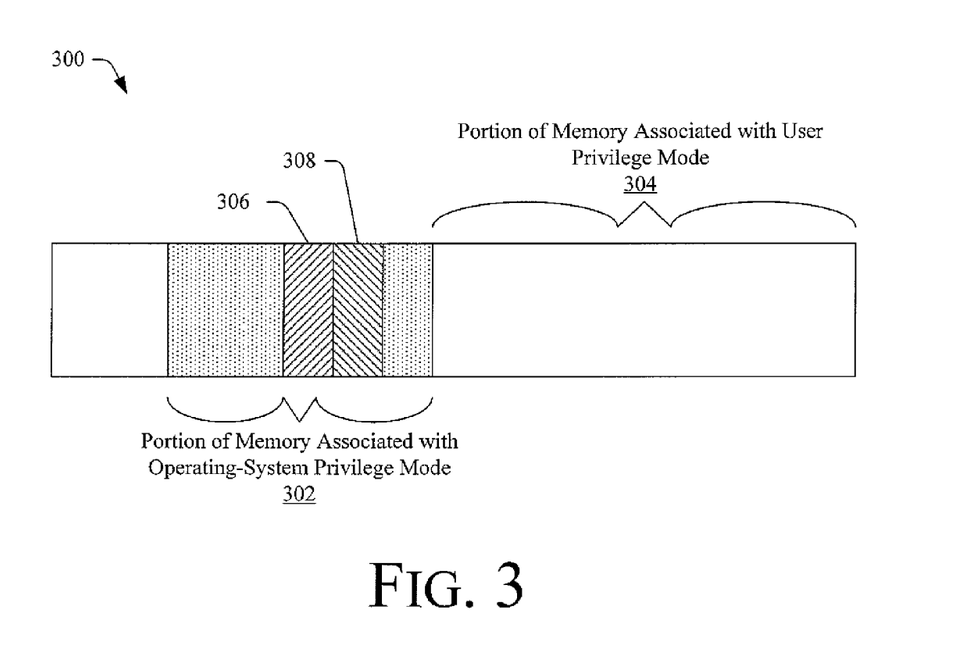
FIG. 3 represents varying portions of computing-device memory in which some of the modules illustrated in FIG. 1 reside.
Figure 4:
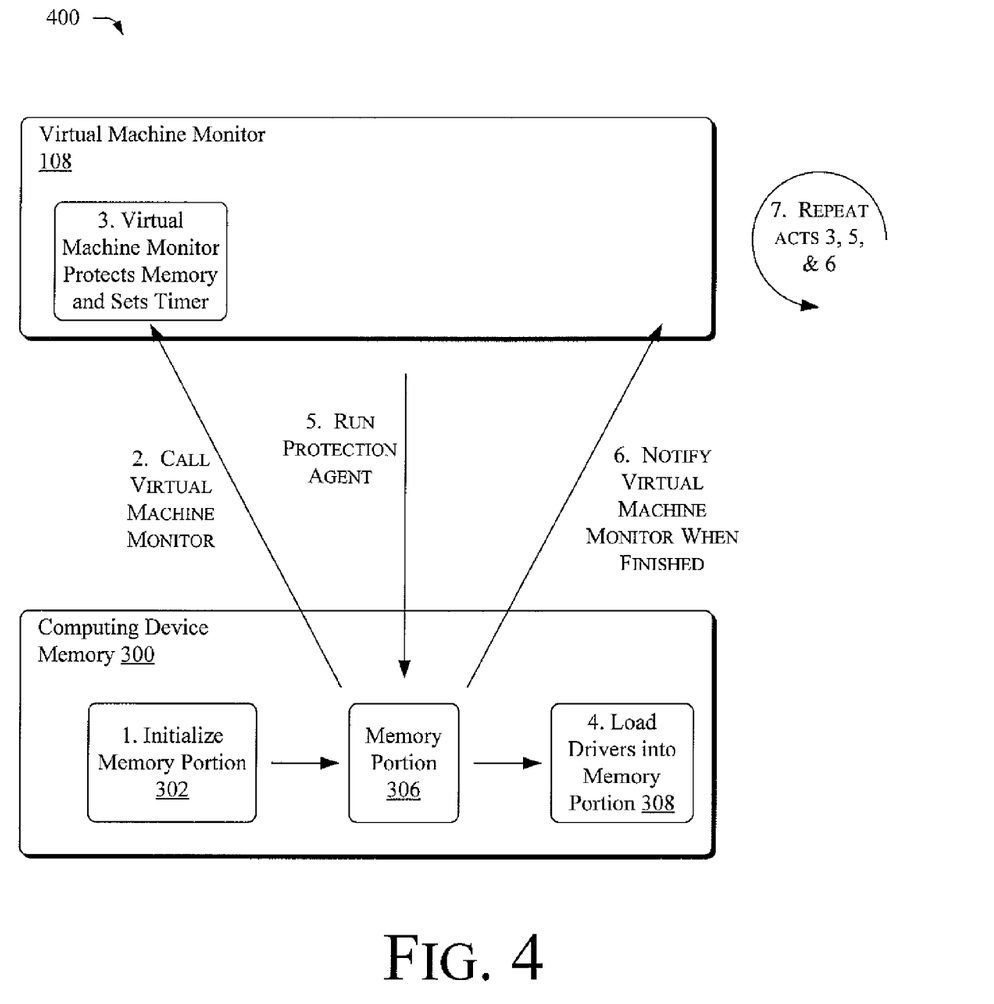
FIG. 4 is a flow diagram illustrating an exemplary manner in which a virtual machine monitor may protect a portion of memory associated with a protection agent and set a timer to run the agent.

FIGS. 3 and 4 illustrate an exemplary manner of creating this protection-agent privilege mode. FIG. 3 depicts all or substantially all of computing-device memory 300. The computing-device memory 300 includes a portion of memory 302 associated with the operating-system privilege mode (e.g., the kernel) and a portion of memory 304 associated with the user privilege mode. The portion of memory 302 also includes, as illustrated, a portion of memory 306 associated with the protection agent 144 as well as a portion of memory 308 in which drivers load.

As FIG. 4 illustrates, a process 400 of creating the protection-agent privilege mode 132 begins at act 1 by initialization of the portion of memory 302 (e.g., the kernel). At act 2, the portion of memory 306 or the protection agent 144 itself calls the virtual machine monitor 108 to request that the virtual machine monitor protect the portion of memory associated with the protection agent. In so requesting, the protection agent or corresponding memory asks that code running within the operating-system privilege mode be disallowed from altering or otherwise touching this portion of memory 306. The protection agent may also verify itself (e.g., by a digital signature) to the virtual machine monitor 108. This portion of memory, or the protection agent itself, may also request that the virtual machine monitor set a timer and run the protection agent when the timer expires. Act 3 represents the virtual machine monitor protecting the memory from entities operating within operating-system privilege mode and setting a timer in response to the request. Note that because this portion of memory 306 associated with the protection agent is now unalterable and/or inaccessible from the operating-system privilege mode, the protection agent now resides in the protection-agent privilege mode.

At act 4, drivers load into the portion of memory 308. Note that the request of act 2 and the corresponding protection of act 3 generally occur before the drivers load into memory, as malware may exist in the form of a driver. As discussed in the "Exemplary Use of the Tools" section below, malware authors often trick users into installing malicious drivers onto a computing device. If one or more malicious drivers do indeed load into memory before the portion of memory 306 is protected, then the malicious drivers may potentially patch over the request for protection itself. Such patching would thereby impede the periodic running of the protection agent via the virtual machine monitor and, hence, creation of the protection-agent privilege mode. By requesting that the virtual machine monitor set a timer early on, however, this process ensures that code within the operating-system privilege mode cannot so disable the periodic running of the protection agent.

Act 5, meanwhile, likely occurs sometime after the drivers have been loaded. As illustrated, act 5 represents the expiration of the virtual machine monitor timer and, hence, the running of the protection agent. When running, the protection agent 144 performs functions similar or identical to those discussed in preceding sections. Also as discussed above, the protection agent may take action in response to a determination that one or more identified resources have been altered. The protection agent may also take such action in response to an attempted access or alteration of the protection agent, or its corresponding memory, from entities operating within the operating-system privilege mode.

Act 6 represents the protection agent notifying the virtual machine monitor when the protection agent finishes running. Finally, act 7 represents the repetition of acts 3, 5, and 6. As such, the virtual machine monitor may reset its timer and run the protection agent at periodic intervals, such as every 100 milliseconds (ms).

By setting a fail-safe timer at the virtual machine monitor, the process 400 thereby eliminates the ability of operating-system code to tamper with the portion of memory associated with the protection agent. As such, this process ensures that the protection agent will continue to run and will not be patched over by malware acting within the operating-system privilege mode. Instead, the protection agent will run within an autonomous privilege mode while still residing within physical memory allocated to the operating system.

Protection-Agent Virtual Processors

Figure 5:
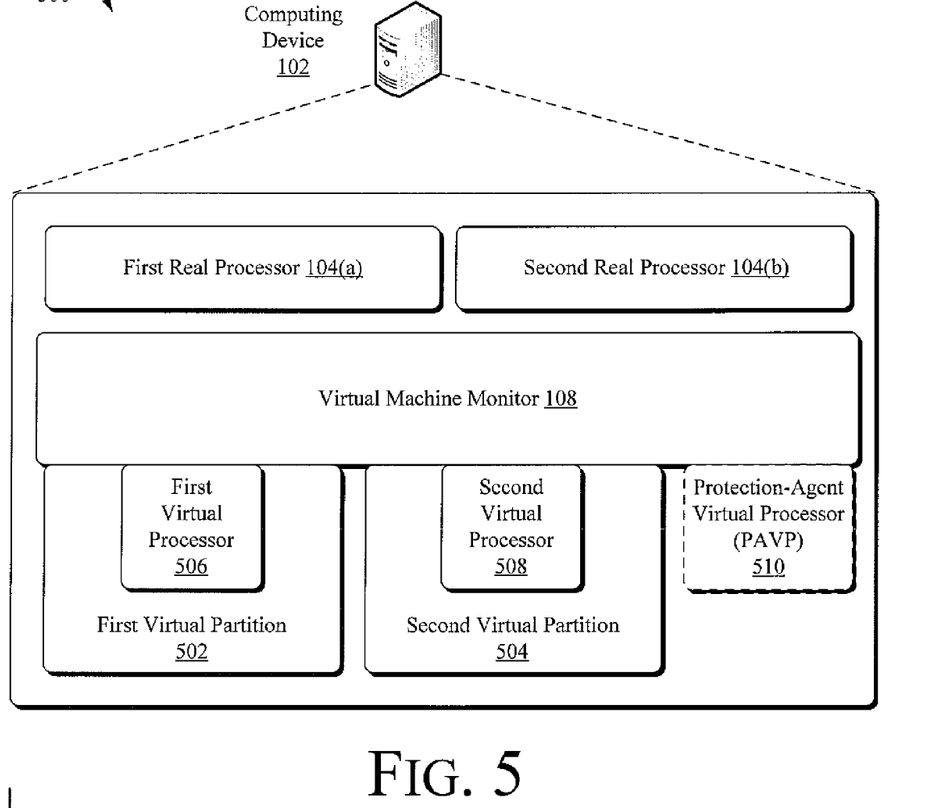
FIG. 5 illustrates an exemplary architecture having a virtual machine monitor capable of virtualizing physical processors into multiple operating-system virtual processors and a protection-agent virtual processor.

This sub-section describes how a virtual machine monitor may create a protection-agent privilege mode by scheduling a virtual processor to run the protection agent 144. FIG. 5 illustrates an architecture 500 that includes the virtual machine monitor 108 virtualizing the computing device 102 into two partitions, each including an operating system. As illustrated, the computing device in this example includes two real processors 104(a) and 104(b), upon each of which the virtual processor can schedule multiple virtual processors. Also as illustrated, the virtual machine monitor creates a first virtual partition 502 and a second virtual partition 504. The first virtual partition includes a first virtual processor 506 to run a first operating system. Similarly, the second virtual partition includes a second virtual processor 508 to run a second operating system. In this instance, however, the virtual machine monitor also includes a protection-agent virtual processor 510 to run a protection agent, such as the protection agent 144 of FIG. 1.

Figure 6:
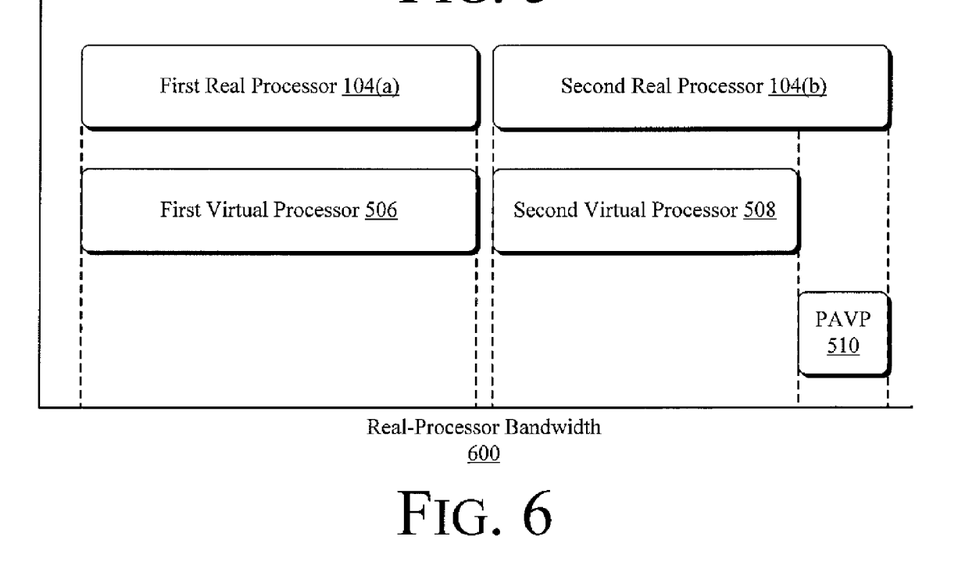
FIG. 6 illustrates how bandwidth of the physical processors of FIG. 5 may be allocated amongst the various virtual processors.

To create the architecture 500, the virtual machine monitor first loads and initializes. As illustrated in FIG. 6, the virtual machine monitor then virtualizes the various virtual processors and, in so doing, allocates real-processor bandwidth 600. To begin this virtualization and allocation, the virtual machine monitor virtualizes the first virtual processor onto the first real processor. In the current example, this virtualization is done on a one-to-one basis as illustrated by FIG. 6. That is, only this single virtual processor 506 corresponds to the real processor 104(a) and, as such, the virtual machine monitor allocates all of the real-processor's bandwidth to this virtual processor. The virtual machine monitor then virtualizes the second virtual processor 508 onto the second real processor 104(b). Instead of a one-to-one basis, however, the virtual machine monitor retains some portion of the second-real-processor's bandwidth. The virtual machine monitor then virtualizes the protection-agent virtual processor 510 onto this remaining bandwidth of the second real processor 104(b), also as illustrated by FIG. 6.

Each virtual processor operating on the second real processor generally acts on a time-sliced basis. That is, the second virtual processor may operate on the second real processor for some amount of time, before the operation of the second virtual processor suspends. At this point, the second real processor switches to operation of the protection-agent virtual processor for some other amount of time. For example, the second virtual processor may operate on the second real processor for 90 ms, at which point the operation of this second virtual processor suspends and operation of the protection-agent virtual processor begins for 10 ms. The protection-agent virtual processor is generally transparent to both operating-system partitions and both the first and second virtual processors. As such, both operating systems believe that their corresponding virtual processors correspond to a respective real processor.

In addition to allocating real-processor bandwidth, the virtual machine monitor also manages the portion of memory that each virtual processor may access. In the current example, the first virtual processor may access all of the memory associated with the first operating system. The second virtual processor, meanwhile, may access all of the memory associated with the second operating system, other than the portion of memory associated with the protection agent. The protection-agent virtual processor alone has access to the portion of memory associated with the protection agent, in addition to the memory allocated to the second operating system.

Furthermore, the first and second virtual processors only have the ability to alter their associated memory. As such, neither of the virtual processors operating their respective operating systems can alter the portion of memory associated with the protection agent. The protection-agent virtual processor, however, may alter the memory associated with the protection agent and, in some embodiments, the memory associated with the second virtual processor as well.

By its programmed nature, the protection-agent virtual processor will periodically run the protection agent. While in some instances the protection-agent virtual processor may run other applications, the current example illustrates a dedicated protection-agent virtual processor. As such, this virtual processor generally only serves to periodically run the protection agent. Again, the protection agent may perform similar or identical functions, in similar or identical manners, as the protection agents described above.

By scheduling a dedicated protection-agent virtual processor, the virtual machine monitor ensures that the protection agent will periodically run under control of this processor and in an autonomous protection-agent privilege mode. Furthermore, because only this protection-agent virtual processor has access to the portion of memory associated with the protection agent, the virtual machine monitor protects this memory from code within an operating system. Therefore, malware operating within an operating-system privilege mode cannot patch over the protection agent and prevent the protection agent from running. As such, this technique essentially eliminates an operating system's ability to tamper with the protection agent.

Exemplary Use of the Tools

Having previously described tools capable of ensuring protection of a protection agent, the following section describes but one example of these tools in operation. First, imagine that a computer user surfs the Internet and, while surfing a certain Website, a dialog box with malicious intent pops up on the user's display. The dialog box requests permission from the user to install some sort of malware on the user's computer. Although this request may be direct, imagine that the dialog box disguises the request as is typically the case. The dialogue box may, for instance, falsely inform the user that he or she has won a prize. In so informing, the dialog box maliciously instructs the user to click the "OK" button on the dialog box in order to receive the prize. Imagine that the user does indeed select the OK button and that the user chooses to continue the requested operations despite one or more warnings from software (e.g., an antivirus application) running on the computing device.

At this point, the computing device begins installation of a driver that contains the malware. As is generally true with drivers, this malicious driver is granted access to an operating-system privilege mode and loads into memory associated with this privilege mode (e.g., the kernel). Once loaded in the kernel, the malicious driver and its accompanying malware essentially have carte blanch access to the computer's memory and operating system. Unfortunately for the user, imagine that this malware includes a key logger that logs a user's keystrokes. Now imagine that the user navigates to his or her bank's Website and signs into his or her bank account. Due to its ability to log keystrokes, the key logger learns the user's bank-account password and sends this password out over the Internet to the author of the malicious driver.

To make the situation worse, imagine that the malware is a "rootkit"—or malware that attempts to actively hide from a protection agent and the user's antivirus software. In conventional systems, a protection agent resides within the kernel (i.e., in memory to which the malicious driver has access). Therefore, in these conventional systems the malware has access to the protection agent and may attempt to hide itself from the protection agent. If successful, the malware would appear to the protection agent to not exist within the kernel. Therefore, when the user's antivirus software calls the protection agent and requests a list of all applications present in the computer's memory, the malware would be absent. This absence renders the antivirus software powerless to know of and remove the malware. Furthermore, the malware may patch over the protection agent, thereby preventing the protection agent from running at all. As such, the protection agent may fail to notice if the malware alters any operating-system resources.

Instead of residing within the kernel as in conventional systems, however, imagine that the protection agent on the user's computing device resides in memory or runs in a mode that is inaccessible from the operating-system privilege mode. Therefore, when the malicious driver loads into the kernel, it does not have access to the memory in which the protection agent resides or the mode in which the protection agent runs. Hence, the driver and its accompanying malware do not have access to the protection agent itself. The malware is thus unable to hide itself from the protection agent and, hence, the antivirus software as well. Therefore, when the antivirus software asks the protection agent for a list of all applications present in the computer's memory, the returned list includes the malware. The antivirus software then recognizes this code as malware and accordingly removes it from the user's computer device. Furthermore, the protection agent may itself notice if the malware alters operating-system resources and, in response, may shut down the user's computing device.

Therefore, by residing in memory or running in a mode that is inaccessible from the operating-system privilege mode, embodiments described herein prevent malware from hiding itself from or patching over the protection agent. In the example above, the user's computing device is therefore able to remove the malware from the machine or, in some instances, shut the system down when the malware alters important resources. In either case, these embodiments serve to lessen malware's effectiveness in its desire to cause harm.

Other Embodiments of the Tools

The above sections describe a few particular examples where a protection agent is made unalterable or inaccessible from the operating-system privilege mode. In this section, other embodiments of the tools are described, such as adding a privilege mode to a processor that is not present on an underlying processor.

These exemplary embodiments are described as part of processes 700 through 1100 of FIGS. 7 through 11. These processes, as well as the exemplary processes described or illustrated with reference to FIGS. 1 through 6, may be implemented in any suitable hardware, software, firmware, or combination thereof; in the case of software and firmware, these processes represent sets of operations implemented as computer-executable instructions stored in computer-readable media and executable by one or more processors. These embodiments of the tools described in this section are not intended to limit the scope of the tools or the claims.

Figure 7:
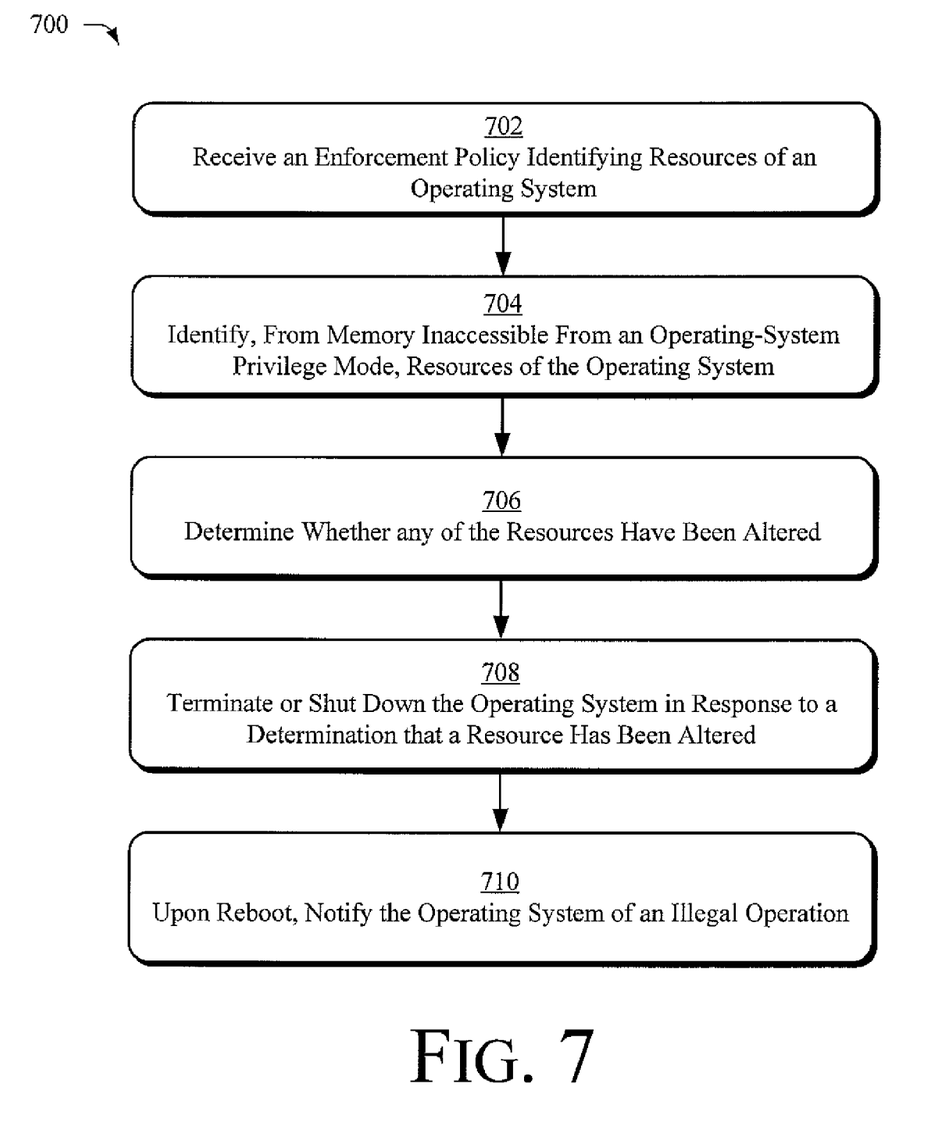
FIG. 7 is an exemplary process illustrating some ways in which the tools may enable and run a protection agent that resides in a location that is inaccessible from an operating-system privilege mode.

With reference to FIG. 7, block 702 receives an enforcement policy identifying one or more operating-system resources. This enforcement policy, which may comprise encrypted data, may be received via a digitally-signed manifest or by exposing an application program interface (API) to the operating system (e.g., a hypercall). Block 704 identifies, from memory inaccessible from an entity operating within an operating-system privilege mode, one or more operating-system resources. Exemplary resources include a system service dispatch table (SSDT), an interrupt dispatch table (IDT), and/or a global descriptor table (GDT). As described above, this identification may occur within a virtual machine monitor (e.g., by protection agent 134 of FIG. 1) or within a separate virtual partition (e.g., by protection agent 142 of FIG. 1).

Block 706, meanwhile, represents determining whether any of the identified resources have been altered. Again, this may take place within a virtual machine monitor or within a separate partition. If block 706 determines that one or more of the identified resources have indeed been altered, then block 708 terminates the operating system in response to this determination. Finally, block 710 notifies the operating system of an illegal operation upon reboot of the operating system.

Figure 8:
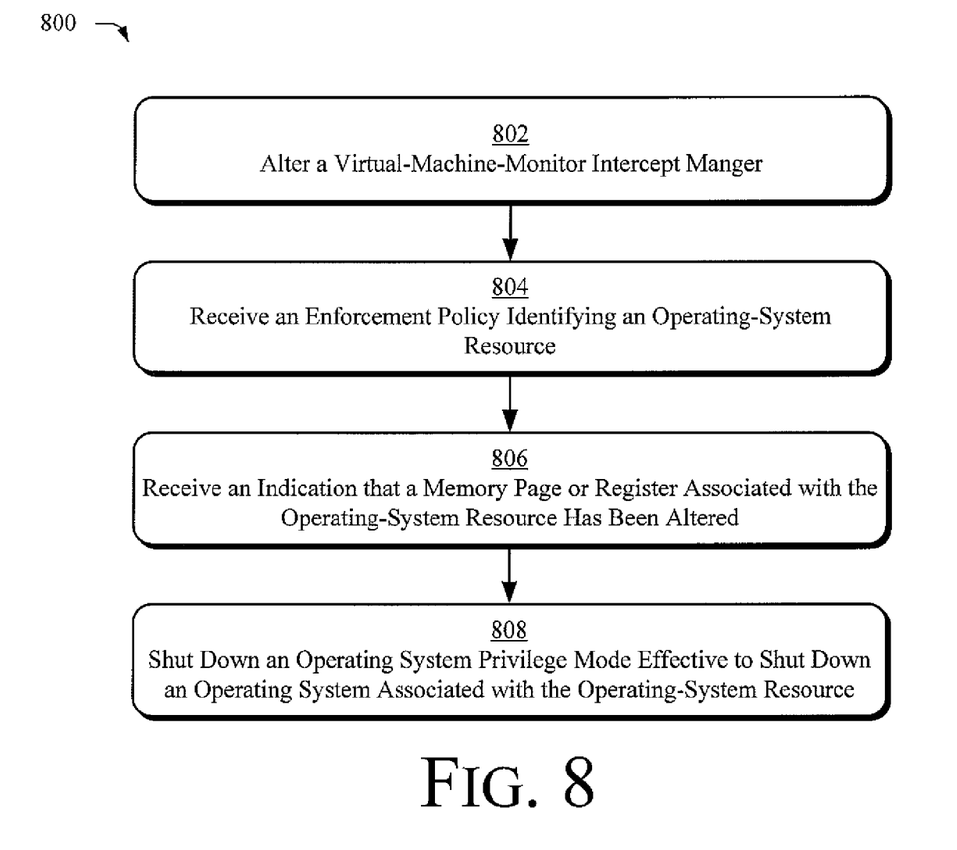
FIG. 8 is an exemplary process illustrating some ways in which the tools may alter a virtual machine monitor to enable and run a protection agent that resides in a location that is inaccessible from an operating-system privilege mode.

FIG. 8 illustrates a process 800 for allowing a protection agent to run within a virtual machine monitor. Block 802 alters a virtual-machine-monitor intercept manager effective to allow for reception of an indication that a memory page or register associated with an operating-system resource has been altered. This resource may comprise one of the resources described with reference to FIG. 7, or may be another operating-system resource. In any event, block 804 receives an enforcement policy identifying the operating-system resource and possibly one or more other operating-system resources. Again, this identification may be done via the techniques discussed above. As described above, a protection attribute (e.g., "read-only" or "init read-only") of the resource may accompany the resource's identification. Block 806, meanwhile, represents the reception of an indication that the memory page or register associated with the operating-system resource has indeed been altered. In response, block 808 shuts down an operating-system privilege mode effective to shut down an operating system associated with the operating-system resource. In some instances, the virtual machine monitor 108 of FIG. 1 may accomplish this shutting down of the operating-system privilege mode.

Figure 9:
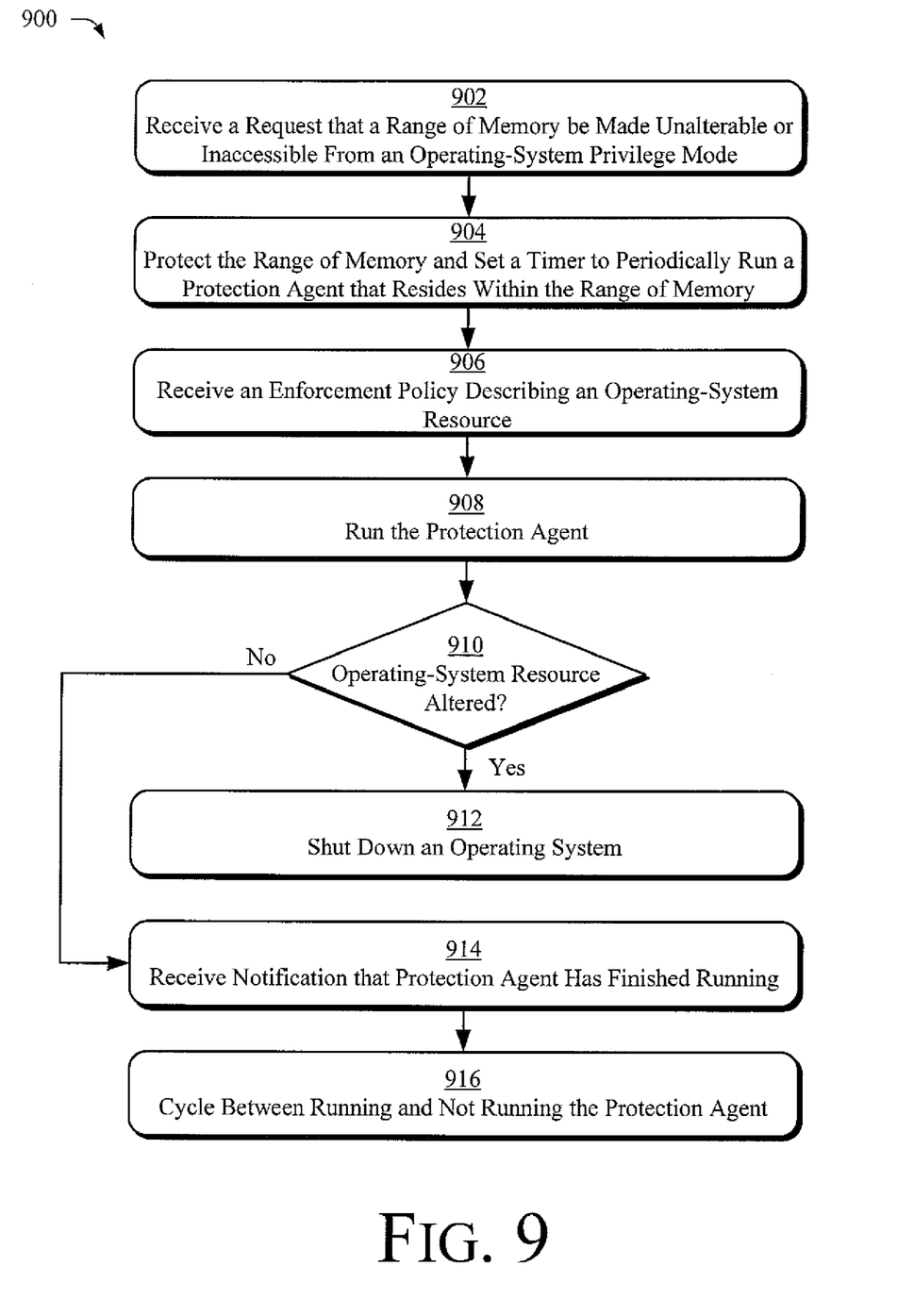
FIG. 9 is an exemplary process illustrating some ways in which the tools may create a protection-agent privilege mode by making a request to a virtual machine monitor.

Next, FIG. 9 describes an exemplary process 900 for creating a protection-agent privilege mode, such as the protection-agent privilege mode 132 illustrated in FIG. 1. Block 902 receives a request that a particular range of memory be made unalterable or inaccessible from an operating-system privilege mode. Again, a virtual machine monitor may receive this request, which may originate from the range of memory itself or from a protection agent residing with the range of memory. Block 904 protects the range of memory and sets a timer to periodically run the protection agent residing with the range of memory. Again, a virtual machine monitor may set such a timer, which may instruct the virtual machine monitor to run the protection agent at regular intervals.

Meanwhile, block 906 receives an enforcement policy describing an operating-system resource. Again, the enforcement policy and described resource may be similar or identical to those discussed above. Block 908 runs the protection agent, which may be achieved by the virtual machine monitor. Decision block 910 questions whether the operating-system resource has been altered. The protection agent may make this determination by functioning in ways described in detail above. If block 910 indeed determines that an alteration has occurred, then block 912 shuts down the operating system. If, however, no such determination is made, then block 914 receives a notification that the protection agent has finished running. In some instances and as described above, the protection agent itself may so notify the virtual machine monitor. Block 916, meanwhile, represents cycling between running the protection agent and not running the protection agent. Finally, note that while the protection agent does not run, the virtual machine monitor may shut down the operating system in response to an attempted access, from an entity operating within the operating-system privilege mode, of the range of memory associated with the protection agent.

Figure 10:
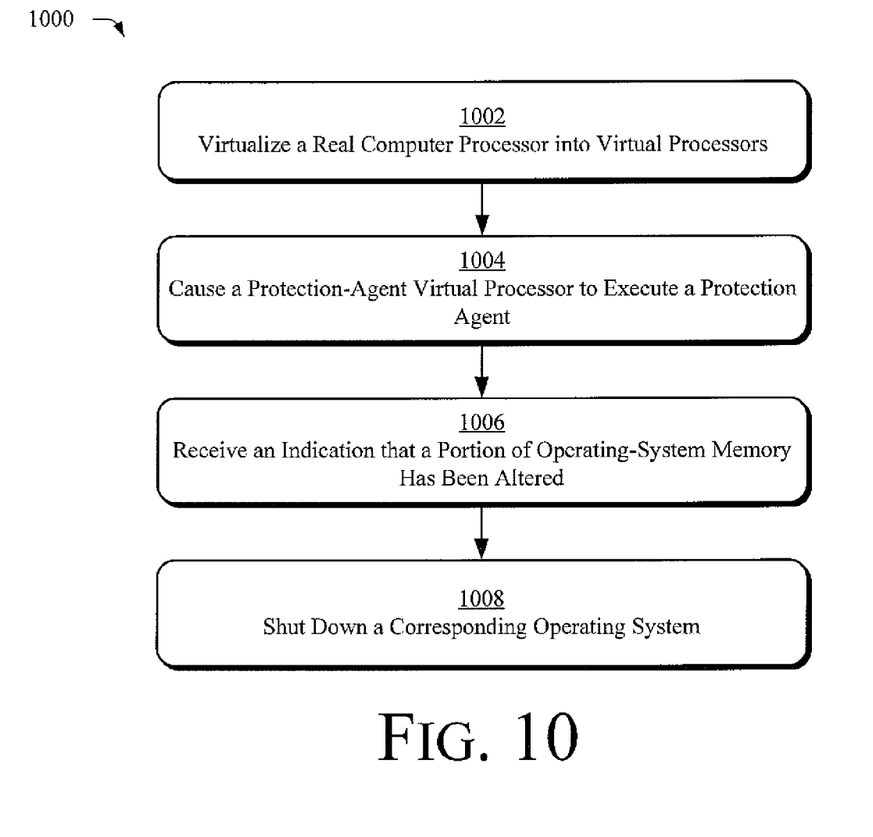
FIG. 10 is an exemplary process illustrating some ways in which the tools may create a protection-agent privilege mode by virtualizing a real computer processor into virtual computer processors, at least one of which is to run a protection agent.

FIG. 10 illustrates another exemplary process 1000 for creating a protection-agent privilege mode, such as the protection-agent privilege mode 132 illustrated in FIG. 1. Block 1002 virtualizes a real computer processor into multiple virtual computer processors. These virtual processors may comprise one or more operating-system virtual processors each having a privilege to alter its own operating-system memory and use a portion of a processing bandwidth of the real processors, as illustrated in FIG. 6. The virtual processors may also include at least one protection-agent virtual processor having a privilege to alter its own protection-agent memory and use a different portion of the processing bandwidth of the real processors. While all of the virtual processors may be scheduled by the virtual machine monitor, the protection-agent virtual processor may be transparent to the operating-system virtual processors. In some instances, the operating-system virtual processors may be incapable of altering memory assigned to the protection-agent virtual processor. Furthermore, the protection-agent virtual processor may be a dedicated processor whose primary or sole purpose is to cause the protection agent to execute, as discussed above.

Next, block 1004 causes the protection-agent virtual processor to execute a protection agent, which may be effective to determine whether or not a portion of said operating-system memory has been altered. Block 1006, meanwhile, receives an indication that a portion of the operating-system memory has been altered. In response, block 1008 shuts down a corresponding operating system.

Figure 11:
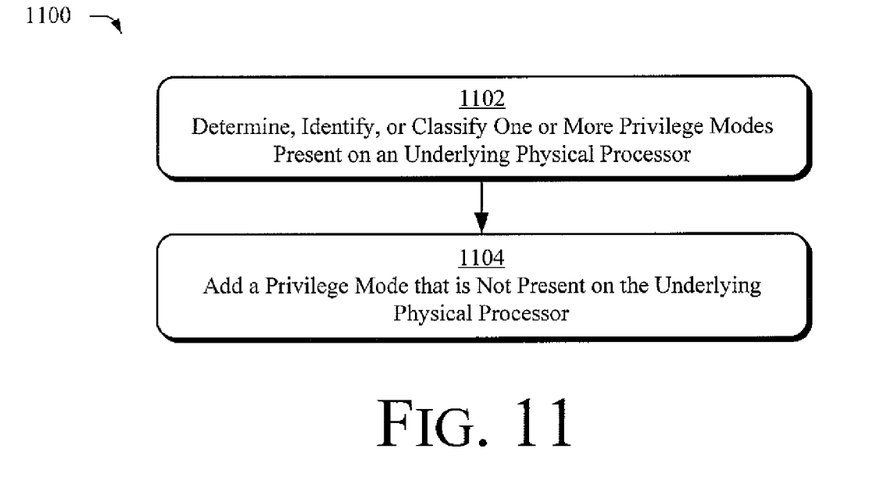
FIG. 11 is an exemplary process illustrating some ways in which the tools may enable an addition of a privilege mode not present on an underlying physical processor.

Finally, FIG. 11 depicts a process 1100 for adding a privilege mode to a real computing processor. Block 1102 represents the determination, identification, or classification of one or more privilege modes present on an underlying physical processor. These privilege modes are generally defined by the underlying physical processor itself. At any rate, block 1104 adds a privilege mode that is not present on the underlying physical processor. In some instances, the added privilege mode is capable of altering a portion of memory of the computing device that is different than a portion of memory that is alterable by the one or more present privilege modes. The added privilege mode may also be capable of adding and executing instructions that previously did not exist or were not executable in the underlying processor.

Furthermore, the one or more privilege modes present on the underlying physical processor may include a user privilege mode and an operating-system privilege mode. In these embodiments, the added privilege mode may be more privileged than both the user privileged mode and the operating-system privilege mode, more privileged than the user privilege mode but less privileged than the operating-system privilege mode, or less privileged than both the user and operating-system privilege modes. Finally, note that one instance of the adding of the privilege mode may comprise adding a protection-agent privilege mode (e.g., protection-agent privilege mode 132 illustrated in FIG. 1) in the multitude of ways discussed above. For example, a protection agent or its associated range of memory may request that the range of memory be made inaccessible from entities operating within the operating-system privilege mode. A virtual machine monitor may also create this privilege mode by scheduling a protection-agent virtual processor to run the protection agent.

Conclusion

The above-described tools are capable of making a protection agent unalterable or inaccessible from an operating-system privilege mode, either by enabling the protection agent to reside in a location that is inaccessible from the operating-system privilege mode, or by creating a protection-agent privilege mode. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. One or more computer-readable media having computer-readable instructions therein that, when executed by a computing device, cause the computing device to perform acts comprising:

providing at least a first partition and a second partition by a virtual machine monitor;

receiving, at memory that is inaccessible by an entity operating within an operating-system privilege mode, an enforcement policy that identifies a set of one or more resources of an operating system operating in the first partition provided by the virtual machine monitor;

identifying, with use of the enforcement policy and from the memory inaccessible by an entity operating within the operating-system privilege mode, the set of one or more resources of the operating system operating in a first partition provided by the virtual machine monitor;

determining, from the memory, whether one or more of the set of one or more resources have been altered; and in response to determining that one or more of the set of one or more resources have been altered (i) terminating the operating system or (ii) notifying the operating system upon reboot of an illegal operation;

wherein the receiving of the enforcement policy, the identifying of the set of one or more resources and the determining of whether one or more of the set of one or more resources have been altered occur within (i) the virtual machine monitor or (ii) the second partition provided by the virtual machine monitor.

2. The media of claim 1, further comprising exposing an application program interface (API) to the operating system and receiving, though the API, an identification of one or more of the set of one or more resources.

3. The media of claim 1, wherein the set of one or more resources includes a system service dispatch table (SSDT), an interrupt dispatch table (IDT), or a global descriptor table (GDT).

4. A method comprising:

altering an intercept manager of a virtual machine monitor effective to enable reception of an indication that a memory page or register associated with an operating-system resource has been altered, the operating-system resource being located within a partition provided by the virtual machine monitor;

receiving at the virtual machine monitor an enforcement policy that identifies the operating-system resource and one or more additional operating-system resources;

receiving by the intercept manager of the virtual machine monitor an indication that the memory page or register associated with the operating-system resource has been altered; and shutting down an operating-system privilege mode effective to shut down an operating system associated with the operating-system resource in response to the receiving of the indication.

5. The method of claim 4, wherein the operating-system resource is an interrupt dispatch table (IDT) at the memory page and the register associated with operating-system resource is an IDT register.

6. The method of claim 4, wherein the operating-system resource is a system service dispatch table (SSDT) or a global descriptor table (GDT).

7. The method of claim 4, wherein the shutting down of the operating-system privilege mode is performed by the virtual machine monitor.

8. The method of claim 4, wherein the enforcement policy also describes a protection attribute associated with each of the identified operating-system resources, at least one of the protection attributes describing a corresponding resource as read-only.

9. The method of claim 8, further comprising enforcing invariance against the resource associated with the read-only protection attribute.

10. One or more computer-readable media having computer-readable instructions therein that, when executed by a computing device, cause the computing device to perform acts comprising:

virtualizing the computing device into at least first and second virtual machine partitions via a virtual machine monitor, wherein an operating system associated with an operating-system privilege mode resides within the first virtual machine partition and a protection agent resides within the second virtual machine partition or the virtual machine monitor;

identifying by the protection agent one or more operating-system resources residing in the first virtual machine partition and designed to operate within the operating-system privilege mode;

determining by the protection agent whether one or more of the one or more operating-system resources residing in the first virtual machine partition have been altered, wherein the protection agent residing within the second virtual machine partition or the virtual machine monitor is not subject to attack from within the operating-system privilege mode; and in response to the determining that one or more of the one or more operating-system resources have been altered, shutting down the operating system associated with the operating-system privilege mode in the first virtual machine partition.

* * * * *